UNITED STATES PATENT OFFICE.

WILLIAM RIPPEY, OF ALLEGHENY, PENNSYLVANIA.

REFRACTORY MATERIAL FOR FURNACES AND CRUCIBLES.

No. 905,925.   Specification of Letters Patent.   Patented Dec. 8, 1908.

Application filed September 25, 1907. Serial No. 394,559.

*To all whom it may concern:*

Be it known that I, WILLIAM RIPPEY, of Allegheny, in the county of Allegheny and State of Pennsylvania, have invented a certain new and useful Improvement in Refractory Material for Furnaces and Crucibles, of which the following is a full, clear, and exact description.

My invention consists in forming the interior walls of all kinds of furnaces, and also crucibles and retorts, of a composition composed of Portland cement and sand, which may be mixed with water and molded to the form of the interior of the furnace, or of the crucible or retort, to be built, or the material may be formed into bricks and used in the ordinary manner of building furnaces of fire-brick. After the furnace or retort has been built it should be subjected to a heat sufficiently intense to bring the sand to the point of incipient fusion and thus form a binding for the cement.

In the practice of my invention I take equal proportions of Portland cement and clean, sharp silica sand and mix them with sufficient water to cause the sand and cement to form a plastic mass which may be molded to the desired shape. This material so formed is then either first subjected to a fusing heat, or built into the furnace and subjected to the required heat after the furnace has been built. The effect of this heat is to fuse the sand and make a solid binding for the cement.

Although I may use equal proportions of sand and cement, these proportions will vary anywhere from ten to fifty per cent. of sand, depending upon the use for which the material is to be employed, and upon the composition and qualities of the sand and cement.

I am aware that attempts have been made to employ Portland cement in the construction of furnaces, which attempts have heretofore been uniformly unsuccessful. I am also aware that the use of mixtures of cement and tar have been attempted, but without practical success.

The advantages of my invention are found in the increased durability of the furnaces and crucibles, and at the same time basic action can be produced without excessive wear to the furnace or to the lining thereof.

Having thus described my invention, what I claim and desire to secure by Letters Patent is:

1. A heat resisting body for refractory use comprising sand and cement heated until fused.

2. The method of making a heat resisting body which consists in mixing sand, cement and water, shaping and heating until the incipient fusion of the sand begins, whereby binding of the body is effected.

In testimony whereof, I have hereunto set my hand.

WILLIAM RIPPEY.

Witnesses:
JAMES K. BAKEWELL,
C. E. EGGERS.